United States Patent Office 3,235,426
Patented Feb. 15, 1966

3,235,426
METHOD OF RENDERING THERMOPLASTIC RESINS RECEPTIVE TO COATINGS
Walter Martin Bruner, Wilmington, Del., assignor to E. I. du Pont de Nemours and Company, Wilmington, Del., a corporation of Delaware
No Drawing. Filed Aug. 1, 1961, Ser. No. 128,385
4 Claims. (Cl. 156—2)

This invention relates to a process for preparing the surfaces of thermoplastic resins to receive paint, adhesives, or other materials in an improved manner, and, more particularly, it relates to a process for treating acetal resins and polyamides with a chemical etching treatment which renders the surfaces of the resins receptive to paint.

It is well known that articles fabricated from acetal resins, polyamides or other thermoplastics, are not usually receptive to paints, adhesives, or the like, which are applied to the surface of the resins in order to provide ornamentation, to provide protection against the effects of sunlight and atmospheric weather conditions, or to laminate the resin to some other material. Frequently, the method of fabrication, e.g. injection molding, provides a smooth glossy surface which makes it even more difficult to promote adhesion with various coatings. In the past, plastic materials have been treated in various ways, including etching, dissolving, flaming, or melting the surface so as to improve the adhesive properties in the surface layer of the resin material. These common methods will improve the receptivity of the surface of thermoplastics to paints, adhesives, and the like, but the improvement is only minor and does not lend itself to use in a commercial process, at modern production rates.

Accordingly, it is an object of this invention to provide a unique surface of polyamide resin or acetal resin which readily accepts surface coatings. It is another object of this invention to provide a painted, etched, thermoplastic resin surface which, because of the peculiar nature of the etching, has a stronger bond between the paint and the resin than any previously known combination, as evidenced by the fact that the painted surface can withstand a great amount of mechanical abrasion without separation of the paint from the resin surface. It is still another object of this invention to provide a process for the preparation of the aforementioned surfaces, as well as to provide an etching composition which is uniquely suitable for the treatment of acetal resins and polyamide resins.

The aforementioned objects are accomplished by providing an article of manufacture made of a normally solid thermoplastic resin, preferably polycaprolactam or polyoxymethylene, with a chemically etched surface which is receptive to coatings, and is characterized by having gloss readings of less than about 60 as measured on a Gardner 75° glossmeter and a roughness of greater than 10 microinches as measured on a Brush "Surfindicator" Model BL-110. The process of this invention provides a sharp etching which is uniform over the entire surface. The etched surface of the present invention is prepared by immersing the thermoplastic resin article to be treated in a solid-in-liquid dispersion, which is an acidic etching medium, at a temperature of from 30–120° C., preferably 80–100° C. for a brief period of time, usually 5–60 seconds, and thereafter removing the article from the etching medium and maintaining it in a gaseous atmosphere at a temperature of from 50–200° C., and preferably from 100–150° C., for another brief period of time, usually 10–180 seconds, following which all the residues of the etching medium are removed by washing with a suitable solvent, and the article is dried and thereupon is ready to receive any coating, such as paint, ink, and adhesives. In the washing treatment it is preferable that all solid particulate matter be removed from the surface of the article, but it is to be understood that this is only a preferred practice when a smooth coating is desired. If an adhesive is to be applied, or if a rough coating is desired, or if the particles are small enough to be hidden by the coating, the particulate matter need not be removed from the etched surface.

A wide variety of thermoplastics may be treated in accordance with the general process of this invention, e.g. polyolefins, polyesters, polyamides, polyaldehydes, polyethers, and polyvinyls. The process is particularly well suited, however, to the treatment of polyamide resins and acetal resins. The acetal resins contemplated for use in this invention are the addition homopolymers, copolymers, terpolymers, and interpolymers of aldehydes such as formaldehyde, acetaldehyde, butyraldehyde, and their cyclic polymers such as trioxane, dioxolane, etc. Two of the acetal resin materials which are available commercially are "Delrin" acetal resin (E. I. du Pont de Nemours & Co.) and "Celcon" acetal copolymer (Celanese Corp. of America).

The polyamides contemplated for use in this invention are the condensation polymers of dicarboxylic acids and diamines, e.g. polyhexamethyleneadipamide, polyhexamethylenesebacamide, polytetramethyleneadipamide, and the various copolymers, terpolymers, and interpolymers made by condensing one or more dicarboxylic acids with one or more diamines; the condensation polymers of monoaminocarboxylic acids; and the polymers of lactams. One of the preferred varieties of polyamides for the purposes of this invention is the polylactam resulting from the base-catalyzed polymerizaiton of lactams having seven or more ring atoms. Examples of these lactams are epsilon-caprolactam, omega-enantholactam, and omega-laurolactam. Examples of the basic catalysts include the alkali metals, the alkaline-earth metals, and the compounds of those metals such as oxides, hydroxides, carbonates, bicarbonates, alkyls, etc. Furthermore, the base-catalyzed polymerization system preferably includes compounds which function as activators or regulators to enhance or to control the speed of the polymerization.

The etching medium which is employed in the process of this invention is a dispersion of solids in a liquid. There are three principal components of the etching medium; namely, the etching agent, the liquid vehicle, and the dispersed solid particles. Other components which may be employed as assistants in the etching medium include a surface tension depressing agent to permit the medium to wet the plastic article being treated and a solubilizing agent to improve the solubility of the etching agent in the liquid vehicle. These principal components and the assistants are discussed in detail below.

The etching agent is a compound capable of rapidly corroding the thermoplastic resin at ordinary temperatures and pressures. The agent may be present in the form of a dispersion, emulsion, or solution with the aforementioned materials. The etching agent may be broadly defined as an acidic substance which in solution or dispersion in water at a concentration of 1 mol per liter exhibits pH values of less than 2.0. These agents include strong acids (mineral acids, carboxylic acids, sulfonic acids, etc.), salts of strong acids and weak bases and other acidic substances. Among the preferred acids are the aromatic sulfonic acids, such as p-toluenesulfonic acid, naphthalenesulfonic acid, and benzenesulfonic acid. Acids such as phosphoric acid, sulfuric acid, and hydrochloric acid are operable, as well as the acid salts, such as stannous chloride, ferric chloride, and zinc nitrate. A particularly desirable etching acid for the purposes of this invention is p-toluenesulfonic acid because of its availability and the fact that it quickly corrodes surfaces of polyamide resins or acetal resins with uniformly sharp etching which, in turn, can be painted easily and with assurance that the painted coating will adhere tenaciously to the etched surface.

The amount of etching agent which is present in the etching medium will, to some extent, depend upon the strength of the agent; that is, a stronger acid can generally be present in smaller concentrations than can a weaker acid in accomplishing the same degree of etching. Generally, however, the amount of etching agent will be from 0.1%–10% by weight of the liquid portion of the etching medium. In the case of the preferred acids, such as p-toluenesulfonic acid, the preferred amount of acid is from 0.1%–2% of the liquid portion of the etching medium.

The liquid vehicle serves as a solvent for the etching agent and as a continuous phase in which inert solid particles are dispersed. The liquid vehicle is the largest component of the etching medium and, therefore, contributes most to the ability of the etching medium to wet the surface of the thermoplastic article being treated. If the inherent wetting capacity of the liquid vehicle is not great enough, there may, of course, be assistants employed such as an appropriate surface tension depressing agent. A further feature of the liquid vehicle is that it must be easily evaporated so that it may be readily removed from the surface of the treated plastic article. Thus, the important properties of the liquid vehicle are that it should be a solvent for the etching agent, it should be able to wet the surface of a thermoplastic resin article, and it should have an atmospheric boiling point of less than about 200° C.

Examples for such liquids are chlorinated hydrocarbons such as perchloroethylene, trichloroethylene, carbon tetrachloride, methylene chloride; ethers such as dioxane, dibutyl ether; esters such as butyl acetate, ethyl acetate, propyl acetate, amyl acetate; ketones such as methyl ethyl ketone, cyclohexanone, acetone; alcohols such as methanol, ethanol, isopropanol, n-propanol, and n-butanol; and water in combination with a suitable surface tension depressant. The preferred liquids are water, saturated aliphatic chlorohydrocarbons, saturated cycloaliphatic chlorohydrocarbons, and aromatic chlorohydrocarbons. Among the most desirable chlorohydrocarbons are perchloroethylene and trichloroethylene.

The amount of liquid vehicle to be employed is from about 80% to about 99.9% by weight of the etching medium. In the most desirable embodiments of this invention the liquid vehicle is present in an amount from 90%–99% by weight of the etching medium.

The dispersed solid particles are important to the process of this invention in attaining a uniform etching pattern and in achieving other benefits. The solids must be insoluble in, and inert to, the etching medium, and the solids must be in the form of fine particles. Any size smaller than about 40 mesh is operable, although it appears that smaller particle sizes, e.g. smaller than 100 mesh, are preferable. The solids which have been found to be operable in the process of this invention include a wide variety of materials since inertness, insolubility, and size are the main qualifications to be considered. The solids known to be especially desirable include the diatomaceous earths (kieselguhrs), such as "Dicalite," manufactured by Great Lakes Carbon Corp., "Super Floss" and "Celite," manufactured by Johns-Manville Corp.; minerals of a high silica content such as quartz, "Cab-O-Sil," manufactured by Godfrey L. Cabot, Inc., and "Hi-Sil," manufactured by Columbia Southern Chemical Co.; and various clays such as attapulgite, kaolinite, and bentonite. As mentioned, this is intended to be only a representative listing which can be supplemented by the many other materials known to those skilled in the art.

Surface tension depressing agents may be used when desired in certain embodiments of this invention. When water is employed as the liquid vehicle, it is preferable to incorporate such an agent so that the water will suitably wet the thermoplastic resin article to be etched. The common types of surface tension depressing agents include the alkylaryl polyether alcohols such as "Triton" X–100, the sulfonic acid salts such as "Alkanol" DW, the long-chain esters, detergents, and soaps. Normally, these materials, when employed, will amount to not more than 5% by weight of the liquid portion of the etching medium.

Solubilizing assistants are sometimes needed to provide the etching agent with rapid and complete solubility in the etching medium. The choice of such solubilizing assistants is a matter of common chemical knowledge. The compounds which are suggested as most useful for this purpose in the process of this invention include ethers, such as 1,4-dioxane and dibutyl ether; ketones, such as methyl ethyl ketone, methyl isobutyl ketone, and cyclohexanone; and esters, such as amyl acetate, isoamyl acetate, and butyl acetate. It will be apparent that in some instances the solubilizing assistant can be the same compound as the surface tension depressing agent, serving two purposes at one time. The amount of solubilizing assistant employed is generally not more than about 5% by weight of the liquid portion of the etching medium.

In the following examples, which are illustrative of several embodiments of this invention, some explanation may be helpful. All parts and percentages are based upon weight unless otherwise specified. The etched surface is measured in two ways to determine gloss and roughness. Specular gloss is measured in accordance with ASTM Designation D1223–52T. The apparatus employed for the measurement is the Gardner glossmeter (portable, 75° angle), manufactured by the Henry A. Gardner Laboratory, Bethesda, Maryland. For a working standard, a clean polished black glass having a specular reflectance of 100 is used. The gloss readings are reported in units relative to this standard. Roughness is a measure of the arithmetic deviation from the tops of the peaks to the bottoms of the valleys in the etched surface. The values of roughness are reported in microinches (millionths of an inch). The measurements are made with a "Surfindicator" Model BL–110, manufactured by the Brush Electronics Co., Cleveland, Ohio. All testing of the adhesion of paint to a surface is accomplished by the "Scotch Tape Test." In these examples this test was employed by scoring the painted surface with a razor blade, cutting through the paint with parallel lines about 1/16" apart and with a similar set of parallel lines aligned at an angle to the first set of lines. The result is a pattern of small diamonds. The Scotch tape is applied over the scored area with manual pressure and then quickly peeled off. If the tape does not peel paint away from the subsurface, the Scotch Tape Test is considered to have been passed successfully. The paint employed in these tests was one or more of three basic types: (1) nitrocellulose lacquer, air-dried, (2) acrylic lacquer, baked finish, (3) alkyd enamel, baked finish. Usually, all three types of paint were tested in each example below. The paint employed was a commercial, high quality, paint designed for automotive or appliance finishes, both inside and outside. The baking cycle employed on the acrylic lacquer and the alkyd enamel was to heat the painted article for 30 minutes at 250° F. On occasion, to provide a more stringent test, the painted article was subject to an "oven aging" test which was accomplished by heating the painted article at 250° F. for 16 hours, after which the Scotch Tape Test was employed. In certain instances a humidity test was employed by heating the painted article at 100° F. and 100% relative humidity for 100 hours, and then subjecting the article to the Scotch Tape Test. This test was not found to be as stringent as the "oven aging" test and, accordingly, the latter was adopted as the usual routine test. In each of the following examples, the etched articles were spray painted and successfully passed the Scotch Tape Test. In a few examples the articles were not subjected to the "oven aging" test, while in the remaining examples the "oven aging" test was employed and successfully passed.

The adhesives which are suitable for use with the etched articles of this invention include epoxy resins, rubber-base contact cement, urea-formaldehyde glue, resorcinol-formaldehyde glue, casein glue, and others known in the plastics industry.

The etching accomplished by the process of this invention is remarkably uniform in that every portion of the area of the surfaces being treated is etched to substantially the same degree. This uniformity is apparently due, in part, to the presence of finely divided solid particles in the etching medium. The profile of the etched areas as viewed microscopically shows a large number of sharp, rugged peaks and crevices which apparently provide strong adhesion forces to hold the paint coating onto the article. Mechanical abrasion, other chemical treatments, sand blasting, and other treatments do not provide the sharply etched areas nor the uniformity of the etching.

*Example 1*

A dispersion of solids in liquid was prepared having the following composition in parts by weight:

|  | Parts |
|---|---|
| p-Toluenesulfonic acid | 0.3 |
| "Dicalite" bulk aid | 1.0 |
| Dioxane | 3.0 |
| Perchloroethylene | 95.7 |

Panels measuring 0.080" x 2⅜" x 3⅜" and made of injection molded "Delrin" acetal resin were immersed in the above dispersion, which was being stirred at a temperature of 90° C., for a period of 30 seconds. After withdrawing the panels from the dispersion, they were held in air at a temperature of 120° C. for 60 seconds. They were then washed in hot water and air dried. The surfaces were uniformly etched and showed average roughness measurements of 55–57 microinches when measured by the "Surfindicator." The surfaces also showed average glossmeter readings of 2 when tested with the Gardner glossmeter.

*Example 2*

A dispersion of solids in liquid was prepared with the following composition in parts by weight:

|  | Parts |
|---|---|
| p-Toluenesulfonic acid | 0.3 |
| #140 quartz | 0.5 |
| Diatomaceous earth | 0.5 |
| Dioxane | 3.0 |
| Perchloroethylene | 95.7 |

Panels measuring approximately ⅛" x 1½" x 2" and made of injection molded "Celcon" acetal copolymer were immersed for 10 seconds in the above dispersion which was being stirred at 120° C. After being withdrawn from the dispersion, the panels were held in air at 120° C. for 60 seconds. They were then washed with water and air-dried. The surfaces were uniformly and smoothly etched.

*Example 3*

A dispersion of solids in liquid was prepared having the following composition in parts by weight:

|  | Parts |
|---|---|
| p-Toluenesulfonic acid | 0.3 |
| "Dicalite" bulk aid | 0.5 |
| Dioxane | 3.0 |
| Perchloroethylene | 96.2 |

A panel measuring 0.094" x 2" x 5" and made of injection molded nylon 66 polyamide resin (polyhexamethyleneadipamide) was contacted for 30 seconds with the above dispersion, which was being stirred at a temperature of 100° C. After being withdrawn from the dispersion, the panel was held in air at a temperature of 121° C. for 60 seconds. It was then washed in water at a temperature of 68° C. for about 10 seconds, and thereafter air-dried. The surfaces were uniformly etched in appearance and showed an average roughness of 28–34 microinches and average glossmeter readings of 9, both measured on the devices described in Example 1.

*Example 4*

A dispersion of solids in liquid was prepared having the following composition in parts by weight:

|  | Parts |
|---|---|
| p-Toluenesulfonic acid | 0.3 |
| "Dicalite" bulk aid | 0.5 |
| Dioxane | 3.0 |
| Perchloroethylene | 96.2 |

Molded panels of "Delrin" acetal resins, "Celcon" acetal copolymer, and nylon 66 polyamide resin (polyhexamethyleneadipamide) were immersed for 60 seconds in the above dispersion, which was being stirred at about 100° C. After withdrawing the panels from the dispersion, they were immediately washed with water at about 70° C. for about 10 seconds. The surfaces were etched and showed average roughness and gloss per mil as follows:

|  | Roughness, microinches | Gloss |
|---|---|---|
| "Delrin" | 52–60 | 1.5 |
| Nylon | 23–27 | 7.5 |
| "Celcon" | 65–85 |  |

*Example 5*

A dispersion of solids in liquid was prepared having the following composition in parts by weight:

|  | Parts |
|---|---|
| p-Toluenesulfonic acid | 0.3 |
| "Dicalite" bulk aid | 1.0 |
| Dioxane | 3.0 |
| Perchloroethylene | 95.7 |

Panels of "Delrin" were intimately contacted with the above dispersion at temperatures in the range of 39–44° C., for a period of 30 seconds. After withdrawing the panels from the dispersion, they were exposed to air at 121° C. for 60 seconds. The panels were then washed with water at 70° C. and air-dried. They were uniformly etched. The etched panels were painted with an automotive-type acrylic lacquer which adhered strongly to the treated surface.

Similar results were obtained employing the dispersions at temperatures of 50–55° C., 60–65° C., 69–74° C., and 78–83° C.

*Example 6*

A dispersion of solids in liquid was prepared having the following composition in parts by weight:

|  | Parts |
|---|---|
| p-Toluenesulfonic acid | 0.3 |
| "Cab-O-Sil" particulate solid | 0.125 |
| Dioxane | 3.0 |
| Perchloroethylene | 96.675 |

Panels of molded "Delrin" were immersed in the above dispersion for 10 seconds at 119° C. After withdrawing the panels from the dispersion, they were held in air at 121° C. for 20 seconds. They were then washed with hot water and air-dried. The surfaces were uniformly etched and showed average roughness of 24–42 microinches.

Example 7

A dispersion of solids in liquid was prepared having the following composition in parts by weight:

| | Parts |
|---|---|
| p-Toluenesulfonic acid | 0.3 |
| "Hi-Sil" X-303 | 0.5 |
| Dioxane | 3.0 |
| Perchloroethylene | 96.2 |

Panels and other molded objects of "Delrin" acetal resin were immersed for 30 seconds in the above dispersion, which was being stirred at 100° C. After withdrawing panels and objects from the dispersion they were held in air at 120° C. for 60 seconds. They were then washed with hot water and air-dried. The surfaces showed average roughness of 52–54 microinches.

Example 8

A dispersion of solids in liquid was prepared having the following composition in parts by weight:

| | Parts |
|---|---|
| p-Toluenesulfonic acid | 0.3 |
| #140 quartz | 1.0 |
| Dioxane | 3.0 |
| Perchloroethylene | 95.7 |

Panels of molded "Delrin" acetal resin were immersed for 60 seconds in the above dispersion at 82° C. After withdrawing the panels from the dispersion, they were held in air at 121° C. for 60 seconds. They were then washed with water and air-dried. The surfaces were uniformly and smoothly etched.

Similar results were obtained by replacing #140 quartz with finely divided attapulgite clay in the above dispersion and contacting panels of "Delrin" with the dispersion at 120° C. for 30 seconds, followed by holding them in air at 120° C. for 60 seconds, washing with water and air-drying.

Similar results were also obtained employing "Celite" diatomaceous earth (Johns-Manville), "Super Floss" (Johns-Manville), bentonite clay, kaolinite clay (C. A. Rowley), or finely divided alumina (Aluminum Company of America).

Example 9

A dispersion of solids in liquid was prepared with the following composition in parts by weight:

| | Parts |
|---|---|
| p-Toluenesulfonic acid | 0.9 |
| Attapulgite clay | 1.2 |
| Dioxane | 5.8 |
| Perchloroethylene | 92.1 |

Panels of "Delrin" were treated by contacting them with the above dispersion for 20 seconds at about 120° C. After withdrawing the panels from the dispersion, they were exposed to an atmosphere of *carbon dioxide at room temperature* for a period of 20 seconds. The panels were then washed with water at 70° C. and air-dried. They were uniformly etched. The etched panels were painted with a commercial acrylic paint.

Example 10

A dispersion of solids in liquid was prepared having the following composition in parts by weight:

| | Parts |
|---|---|
| p-Toluenesulfonic acid | 22.5 |
| Diatomaceous earth | 30 |
| Dioxane | 144 |
| Trichloroethylene | 2304 |

Panels of "Delrin" were contacted with the above dispersion for 10 seconds at 88° C. After withdrawing the panels from the dispersion, they were held in air at a temperature of 121° C. for 30 seconds. They were then washed in water at about 70° C. for about 10 seconds and air-dried. The surfaces were uniformly and sharply etched.

Example 11

A dispersion of solids in liquid was prepared having the following composition in parts by weight:

| | Parts |
|---|---|
| p-Toluenesulfonic acid | 0.5 |
| Attapulgite clay | 1.0 |
| #140 quartz | 9.0 |
| Methyl ethyl ketone | 5.0 |
| Perchloroethylene | 84.5 |

Panels of "Delrin" were contacted with the above dispersion for 10 seconds at 120° C. After withdrawing the panels from the dispersion, they were held in air at 121° C. for 120 seconds. They were then washed with water and air-dried. The panels were uniformly and smoothly etched.

Example 12

A dispersion of solids in liquid was prepared having the following composition in parts by weight:

| | Parts |
|---|---|
| p-Toluenesulfonic acid | 24.9 |
| Bentonite clay | 45 |
| "Alkanol" DW | 2.4 |
| Water | 2040 |

Panels of "Delrin" were contacted with the above dispersion for 60 seconds at 95° C. After withdrawing the panels from the dispersion, they were held in air at 121° C. for 60 seconds. They were then washed with water and air-dried. The surfaces were uniformly and smoothly etched.

Example 13

A dispersion of solids in liquid was prepared having the following composition in parts by weight:

| | Parts |
|---|---|
| p-Toluenesulfonic acid | 0.9 |
| Diatomaceous earth | 2.0 |
| #140 quartz | 2.0 |
| "Triton" X-100 surface tension depressing agent | 0.1 |
| Water | 95.0 |

Panels measuring 0.080" x 2⅜" x 3⅜" and made of injection molded "Delrin" acetal resin were contacted with the above dispersion for 60 seconds at a temperature of 90° C. After withdrawing the panels from the dispersion, they were held in air at a temperature of 120° C. for 60 seconds. The panels were then washed in hot tap water at a temperature of about 60° C. for about 10 seconds and air-dried. The surfaces were uniformly etched in appearance and showed average glossmeter readings of 1.5 and average surface roughnesses of 75–80 microinches.

Example 14

A dispersion of solids in liquid was prepared having the following composition in parts by weight:

| | Parts |
|---|---|
| Naphthalenesulfonic acid monohydrate | 6 |
| "Dicalite" bulk aid | 20 |
| Methanol | 60 |
| Perchloroethylene | 1914 |

Panels of molded "Delrin" acetal resin were contacted with the above dispersion for 30 seconds at 77° C. After withdrawing the panels from the dispersion, the panels were held in air at 121° C. for 60 seconds. They were then washed with hot water and air-dried. The surfaces were uniformly and smoothly etched.

Example 15

A dispersion of solids in liquid was prepared having the following composition in parts by weight:

| | Parts |
|---|---|
| Phosphoric acid | 4.0 |
| Attapulgite clay | 1.0 |
| "Triton" X–100 surface tension depressing agent | 0.1 |
| Isoamyl alcohol | 19.0 |
| Perchloroethylene | 75.9 |

Panels of "Delrin" were contacted with the above dispersion for 180 seconds at 95° C. After withdrawing the panels from the dispersion, they were immediately washed with hot water and air-dried. The surfaces were uniformly and sharply etched. A high grade, commercial, baked alkyd-type enamel adhered strongly to the surface.

Example 16

A dispersion of solids in liquid was prepared having the following composition in approximate parts by weight:

| | Parts |
|---|---|
| Phosphoric acid | 4.0 |
| "Triton" X–100 | 0.04 |
| Water | 72.0 |
| Denatured ethyl alcohol | 23.96 |

"Delrin" molded panels were contacted with the above composition, stirred at about 80° C., for a period of about 10 seconds. After withdrawing from the treating composition, the panels were immediately washed with water and air-dried. The surfaces showed an etched appearance, and commercial acrylic coating ("Lucite") showed good ahesion on the surface.

Example 17

A dispersion of solids in liquid was prepared having the following composition in parts by weight:

| | Parts |
|---|---|
| Phosphoric acid | 10.0 |
| "Dicalite" bulk aid | 0.5 |
| "Triton" X–100 surface tension depressing agent | 0.1 |
| Water | 89.4 |

Panels of nylon 66 polyamide resin (polyhexamethyleneadipamide, "Delrin" acetal resin, and "Celcon" acetal copolymer were contacted with the above dispersion for 60 seconds at a temperature of 95° C. After withdrawing the panels from the dispersion, they were held in air at a temperature of 120° C. for 60 seconds. The panels were then washed in hot tap water for about 10 seconds, and air-dried. The surfaces showed uniformly etched appearances having characteristics as follows:

| | Roughness, microinches | Gloss |
|---|---|---|
| Nylon 66 | 14–20 | 46 |
| "Delrin" | 110–140 | 2 |
| "Celcon" | 35–55 | |

Example 18

A dispersion of solids in liquid was prepared having the following composition in parts by weight:

| | Parts |
|---|---|
| Sulfuric acid | 1.0 |
| "Dicalite" bulk aid | 0.5 |
| "Triton" X–100 | 0.1 |
| Water | 98.4 |

Panels of "Delrin" acetal resin and nylon 66 polyamide resin (polyhexamethyleneadipamide) were contacted with the above dispersion for 30 seconds at 95° C. After withdrawing the panels from the dispersion, they were held in air at 120° C. for 60 seconds. They were then washed with water and air-dried. The surfaces showed average roughness and glossmeter values as follows:

| | Roughness, microinches | Gloss |
|---|---|---|
| "Delrin" | 240–260 | 6.5 |
| Nylon | 7–9 | 47 |

Example 19

A solution was prepared having the following composition in approximate parts by weight:

| | Parts |
|---|---|
| Stannous chloride | 4.0 |
| Denatured ethyl alcohol containing 0.05% "Triton" X–100 | 96.0 |

"Delrin" molded panels were contacted with the above composition, stirred at about 79° F., for various periods in the range of 10–30 seconds. After withdrawing from the treating composition, the panels were held in air at 121° C. for a period of 120 seconds. They were then washed with denatured alcohol. The surfaces were etched, but not as uniformly as found when using dispersed solids in the etching medium. The etched panels were spray painted with acrylic lacquer, nitrocellulose lacquer or baking alkyl enamel, as described previously. In each instance, the adhesion was good where the etching took place but, as stated above, the uniformity of adhesion was not as good as that obtained when dispersed solids are in the etching medium.

Similar results were obtained with ferric chloride instead of stannous chloride in the above composition and process.

Example 20

A dispersion of solids in liquid was prepared having the following composition in parts by weight:

| | Parts |
|---|---|
| p-Toluenesulfonic acid | 0.8 |
| Attapulgite clay | 1.1 |
| No. 140 quartz | 11.6 |
| Dioxane | 5.0 |
| Perchloroethylene | 81.5 |

Various molded articles made of "Delrin" acetal resin were immersed in the above dispersion for 10 seconds at 120° C. The articles were then withdrawn from the dispersion and air-dried at 120° C. for 2 minutes, following which the articles were washed with water and air-dried. The articles, which were uniformly and sharply etched by the above treatment, were painted and the painting withstood the Scotch Tape Test. The articles were then heated at 100° F. and 98% relative humidity for 96 hours, and again the articles withstood the Scotch Tape Test.

Example 21

A dispersion of solids in liquid was prepared having the following composition in parts by weight:

| | Parts |
|---|---|
| p-Toluenesulfonic acid | 0.5 |
| "Dicalite" bulk aid | 0.5 |
| Dioxane | 3.0 |
| Perchloroethylene | 96.0 |

Various molded articles made from polycaprolactam prepared in a base-catalyzed polymerization system were given comparative paint adhesion tests before and after being subjected to an etching treatment by the above-described dispersion. The articles which were etched were immersed in the above dispersion for 10 seconds or 30 seconds at 120° C. followed by drying in air at 120° C. for 60 seconds. The articles were then washed with hot water to remove all traces of the dispersion, dried, and tested to determine roughness and gloss. The articles were then painted with an acrylic lacquer to determine the quality of the paint adhesion. The following results were obtained:

| Sample | Immersion Time (Sec.) | Roughness (Micro-inches) | Gloss | Paint Adhesion |
|---|---|---|---|---|
| A—Control | 0 | 7–12 | 85 | Poor. |
| A—Etched | 10 | 20–46 | 27 | Good. |
| B—Control | 0 | 8–13 | 69 | Poor. |
| B—Etched | 30 | 18–30 | 13 | Good. |
| C—Control | 0 | 16–32 | 92 | Fair. |
| C—Etched | 10 | 18–38 | 51 | Very Good. |
| D—Control | 0 | 8–14 | 85 | Fair. |
| D—Etched | 30 | 22–34 | 13 | Very Good. |

*Example 22*

The same etching medium and process as those described in Example 21 were employed to treat molded articles of polycaprolactam prepared by polymerization in the presence of water or an acidic catalyst. This experiment gave the following results:

| Sample | Immersion Time (Sec.) | Roughness (Micro-inches) | Gloss | Paint Adhesion |
|---|---|---|---|---|
| A—Control | 0 | 7–16 | 70 | Fair. |
| A—Etched | 10 | 14–24 | 20 | Very Good. |
| B—Control | 0 | 2–4 | 69 | Fair. |
| B—Etched | 30 | 17–30 | 10 | Very Good. |

The invention is not intended to be limited in any fashion other than by the descriptions in the appended claims.

I claim:

1. A process for treating the surface of articles fabricated from a thermoplastic resin selected from the group consisting of polyamide resin and acetal resin in order to improve the receptivity of said surface to coatings which comprises contacting said surface with a solids-in-liquid dispersion at a temperature of about 30° to 200° C., said dispersion comprising (1) 99.9 to 85% by weight of a continuous liquid phase consisting essentially of a liquid vehicle and containing approximately 0.1 to 20% by weight of a strong acidic etching agent capable of quickly corroding said surface at ordinary temperatures and pressures, and (2) 0.1 to 10% by weight of a discontinuous solid phase consisting essentially of a particulate solid material which is insoluble in said liquid phase and has a particle size of less than 40 mesh and removing said surface from contact with said dispersion.

2. The process of claim 1 in which said acidic etching agent is a substance which in water at a concentration of 1 mol per liter exhibits a pH of less than 2.0.

3. The process of claim 2 in which said acidic etching agent is an aromatic sulfonic acid.

4. A process for treating the surfaces of an article of manufacture made of a thermoplastic selected from the group consisting of polyamide resin and acetal resin in order to improve the receptivity of said surfaces to coatings, said process comprising immersing said article in a solid-in-liquid dispersion maintained at a temperature of 30°–120° C. and consisting essentially of 0.1%–10% by weight of p-toluenesulfonic acid, 0.1%–10% by weight of a particulate solid of a size smaller than 40 mesh and being selected from the group consisting of diatomaceous earth, silica, hydrated silica, minerals of a high silica content, attapulgite clay, kaolinite clay, and bentonite clay, and 80%–99.8% by weight of a liquid having an atmospheric boiling point of less than 200° C. and being selected from the group consisting of water, saturated aliphatic chlorohydrocarbons and saturated cycloaliphatic chlorohydrocarbons, and aromatic chlorohydrocarbons; removing said article of manufacture from said dispersion and permitting the article to dry at a temperature of about 50°–200° C., washing said article to remove all residues of said dispersion, drying said article, and recovering said article with uniformly sharp etching on the surfaces of said article which were in contact with said dispersion.

References Cited by the Examiner

UNITED STATES PATENTS

| 2,701,218 | 2/1955 | Nickerson | 117—138.8 |
| 2,828,528 | 4/1958 | Gajjar | 156—7 XR |
| 2,879,177 | 3/1959 | Nelson et al. | 117—47 XR |
| 3,060,550 | 10/1962 | Smith | 156—7 XR |
| 3,091,553 | 5/1963 | Matsumoto et al. | 156—2 XR |
| 3,095,373 | 6/1963 | Blomfield | 117—47 XR |

FOREIGN PATENTS 650,152   2/1951   Great Britain.

ALEXANDER WYMAN, *Primary Examiner.*

EARL M. BERGERT, JACOB STEINBERG, *Examiners.*